Patented Nov. 7, 1939

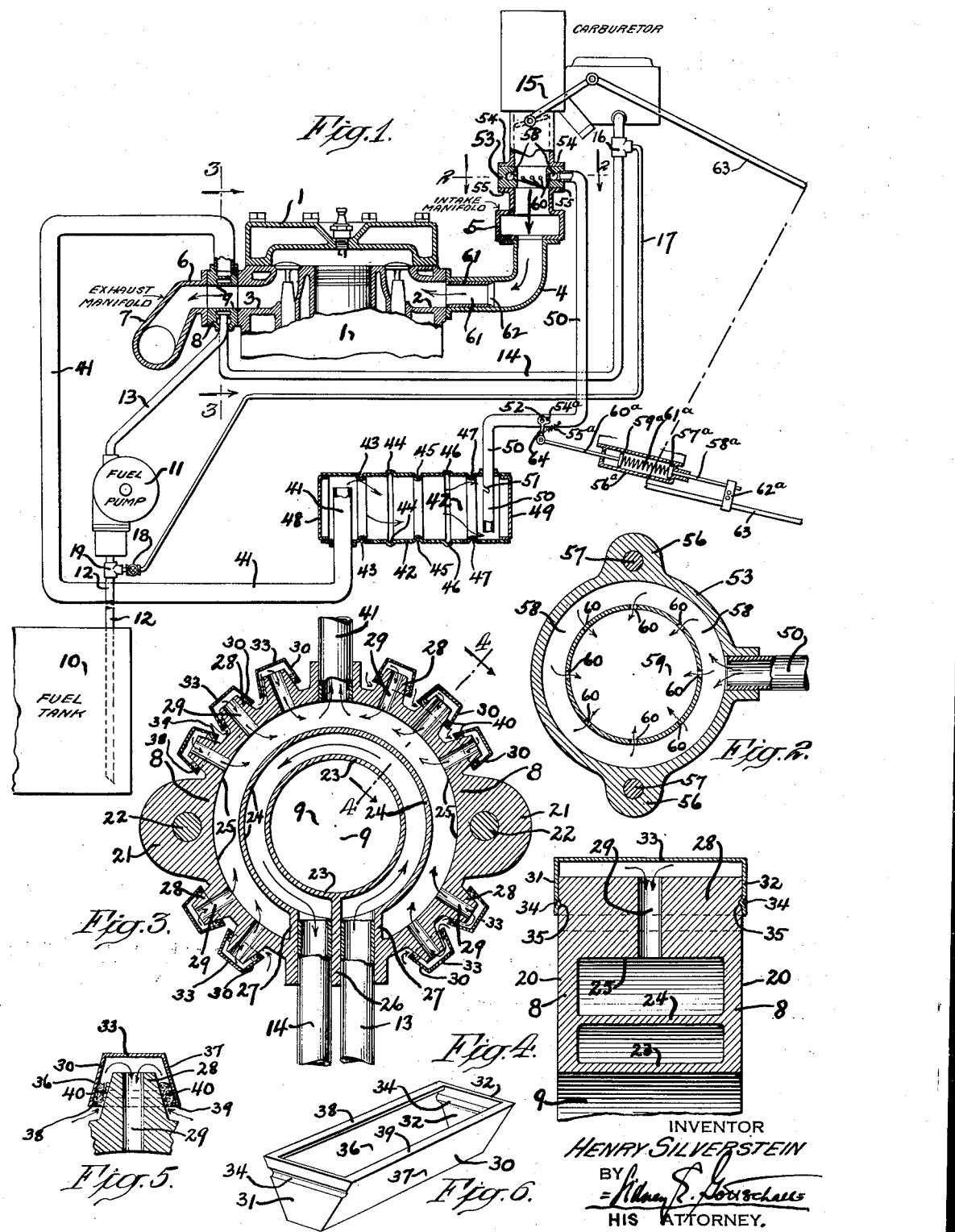

2,179,235

UNITED STATES PATENT OFFICE 2,179,235

METHOD AND APPARATUS FOR REGULATING CHARGE FOR INTERNAL COMBUSTION ENGINES

Henry Silverstein, Brooklyn, N. Y.

Application July 30, 1936, Serial No. 93,387

15 Claims. (Cl. 123—122)

This invention relates broadly to certain new and useful improvements in method and apparatus for regulating charge for internal combustion engines.

This application co-pends with my application Serial No. 167,115, filed October 4, 1937, presently entitled, Heating devices, and which is a division hereof.

One of the objects of this invention is the provision of a construction wherein the combustible charge delivered to the cylinder of an internal combustion engine may be so regulated that when thus supplied it is at predetermined and proper conditions of temperature, pressure and density of mixture.

Another object of this invention is the provision of a construction wherein and whereby the combustible charge delivered at the intake port or ports of an internal combustion engine is at such conditions of temperature, pressure and density of mixture that the subsequent employment and combustion thereof will yield and develop a maximum of energy in the engine.

Another object of this invention is the provision of a construction which when used in conjunction with internal combustion engines of the automotive type is adapted to so control and regulate the conditions of the combustible charge supplied at the intake port or ports of the engine that a substantial increase in the mileage per gallon of fuel employed is produced and the fuel develops and yields a maximum of energy upon combustion thereof in the engine.

Another object of this invention is the provision of a construction adapted to so control and regulate the general characteristic conditions of the combustible charge delivered to the intake port or ports of an internal combustion engine that such charge upon "explosion stroke" of the engine is burnt and consumed to the greatest possible extent and a maximum of energy is developed thereby and extracted therefrom for useful work; and since the combustion of the charge is rendered as full and complete as possible a resulting substantial reduction in the quantity of "end products" such as carbon, carbon monoxide, etc., which normally are left over in considerable degree after combustion, is attained.

Another object of this invention is the provision of a construction wherein and whereby combustible fuel may be preheated from the heat of the exhaust gases of an internal combustion engine before such fuel is delivered to the carburetor, and wherein and whereby the mixture leaving the carburetor may be intimately associated with a predetermined proper amount of preheated air which likewise may be heated from the heat of the exhaust gases to predetermined and proper degree; and wherein and whereby the charge mixture resulting is thereafter regulated and delivered at proper and predetermined characteristic conditions at the intake port or ports of the internal combustion engine for employment in the cylinder or cylinders thereof.

A still further object of this invention is the provision of a construction wherein and whereby combustible fuel adapted to use in an internal combustion engine may be properly preheated before being delivered to the carburetor and the mixture leaving the carburetor may be further regulated by the addition thereto of a proper predetermined amount of preheated air at proper conditions of temperature, pressure and volume and the mixture thereafter so controlled and regulated as to general characteristic conditions that same will prove most efficient when employed in the engine, i. e., will produce a maximum of useful energy per unit volume of fuel employed.

A still further object of this invention is the provision of a construction wherein there is provided auxiliary means adaptable to use under cold weather conditions for providing the additional heat necessary to the proper preheating of fuel under such conditions and for the purposes and objects herein disclosed.

A still further object of this invention is the creation of a novel method for the preparation of a combustible charge for use in an internal combustion engine so that said charge when employed in the engine will prove most efficient, i. e., will produce a maximum of useful energy per unit volume of fuel employed; and which charge will be burnt and consumed to the greatest possible degree upon explosion thereof within the engine and leave a minimum of "end products" such as carbon, carbon monoxide, etc., which normally are left over in considerable degree after combustion.

A still further object of this invention is the provision of a construction which is rugged, simple and cheap to manufacture, install and use and which will present the desired advantages hereinafter disclosed.

Various other objects and advantages of the invention than those hereinabove mentioned will appear more fully hereinafter. It is to be understood, that the specific forms shown are merely illustrative and hence the detailed description thereof is not to be taken as limiting the invention itself.

This invention resides substantially in the parts as well as the combination, construction, arrangement and relative location of parts, as well as in the steps, sequence of steps and combination of steps, all as will appear more fully hereinafter.

Referring to the drawing, in which the same reference numerals are used throughout the several views to indicate the same or similar parts, it will be found that:

Fig. 1 represents a diagrammatic view of an assembly of a construction employing the novel principles of my invention, shown with certain parts thereof in section and certain other parts thereof partially broken away;

Fig. 2 represents a sectional view, taken along the section line 2—2 in Fig. 1, looking in the direction of the arrows;

Fig. 3 represents a sectional view, taken along the section line 3—3 in Fig. 1, looking in the direction of the arrows;

Fig. 4 represents a sectional view, taken along the section line 4—4 in Fig. 3, looking in the direction of the arrows;

Fig. 5 is an enlarged detail view in section of one of the vanes shown as broken away from the heating unit shown in Fig. 3; and Fig. 6 is a perspective view of an inverted vane-canopy or cap of which sectional views are shown in Figs. 3 and 5.

It is well known that internal combustion engines of the automotive type having found wide industrial and commercial adaptation and use in automobiles, marine engines and the like, have nevertheless presented certain operating difficulties and shortcomings of undesirable character. Thus, as is well known, the combustible charge (even with substantially ideal conditions of timing, valve regulation, etc.) is usually incompletely burnt upon explosion of the charge within the engine cylinder or cylinders. Accordingly a maximum of energy per unit volume of fuel employed is not developed and the engine does not get as much work and energy out of the fuel as it possibly could. Moreover, due to incomplete combustion the left over gases presented for exhaustion on "exhaustion stroke" of the engine are relatively rich in "end products" such as carbon, carbon monoxide, etc. Thus carbon deposits are left on the walls of the cylinder or cylinders, valves, valve seats, valve stems, etc., the motor oil becomes polluted with carbon and various engine parts require periodic scraping or other appropriate treatment to keep the deposits at a minimum. Furthermore, often the exhaust gases will be found to contain a substantial unburnt portion of the original combustible charge and such portion, of course, is wasted.

Numerous attempts have been heretofore made in various directions looking towards a better or more complete combustion of the explosive charge supplied to the engine. I have found that proper predetermination and regulation of the characteristic conditions of the charge supplied to the engine cylinder or cylinders is effective to greatly increase the fullness and completeness of the combustion which takes place within the cylinder or cylinders, with a resulting substantial increase in efficiency. I have found also that this has entailed a very substantial increase in the amount of useful energy that could be developed by and extracted from the combustible charge per unit volume of fuel employed and further that a decidedly substantial reduction has been presented in the undesirable characteristics of the exhaust products such as carbon, carbon monoxide, etc., as well as unburnt gases.

It is the purpose of this invention, therefore, to provide method and apparatus for regulating the combustible charge supplied to the cylinder or cylinders of internal combustion engines so that appropriate, proper and necessary adjustment can be effected in the characteristic conditions of such charge and thereby attain the desired advantages just discussed.

As will be hereinafter noted, means are disclosed herein for presenting appropriate regulated preheating of fuel supplied to the carburetor in accordance with temperature conditions of the surrounding atmosphere and means are further provided to add to the charge leaving the carburetor an appropriate regulated amount of air in proper fashion and under proper conditions of temperature, pressure and volume. Further, it will be hereinafter observed that means are provided for regulating the conditions under which the charge is thereafter supplied at the intake port or ports of the internal combustion engine.

Referring now to the drawing for a specific example of my novel construction, it will be noted from Fig. 1 that I have shown a conventional internal combustion engine 1, having an inlet port 2 and an exhaust port 3. Although I will proceed to hereinafter describe my invention in connection with but a single engine cylinder, it should naturally be understood that the same may be employed in cases of engines comprised of more than a single cylinder. As is usually the case inlet port 2 is connected by a pipe 4 to an intake manifold 5 and exhaust port 3 is connected by a pipe 6 to the exhaust manifold 7. Connected between exhaust port 3 and pipe 6 I interpose my heating unit 8, more fully hereinafter described, in such fashion that the exhaust gases, etc. leaving exhaust port 3 will flow through a central passage-way 9, running therethrough on their way out through pipe 6 to the exhaust manifold 7. Due to the passage of the exhaust gases, etc. through passageway 9 a substantial portion of the heat contained therein will be available for furnishing the heat required by the heating unit 8. Turning now to the fuel supply it will be noted that I provide a conventional fuel tank 10 from which a fuel pump 11 (which is preferably engine driven) is adapted to draw gasoline or other fuel via a pipe 12 and to thereafter force the same along a pipe 13 to the heating unit 8. After leaving the heating unit the fuel, as heated in said unit, continues along a pipe 14 to a conventional carburetor 15 which may be either of the up or down draft type (the one illustratively shown in Fig. 1 of the drawing being a conventional down draft carburetor). Just before pipe 14 is joined to the casing of carburetor 15 it is provided with a T-coupling 16 to which is joined a by-pass pipe 17 adapted to by-pass a fraction of the quantity of heated fuel back to pipe 12 via a valve 18 and a T-coupling 19. It will be understood, of course, that although valve 18 is diagrammatically shown in the drawing as adjacent T-coupling 19, it, in actual practice, may be located either adjacent said coupling or adjacent the T-coupling 16 or as a matter of fact anywhere along the length of pipe 17, all as is best or most convenient and useful. It should be further understood that valve 18 is opened whenever it is desired that extra heat be furnished to the fuel, such for example as when the system disclosed operates during cold weather, or when it is found that the extra heat is required to assure proper ultimate characteristic conditions of the combustible charge. In this connection it will be observed that by by-passing and returning a fraction of the heated fuel just before the same enters the carburetor that the fuel generally will be given an extra amount of heat by the recirculation of the by-passed portion through the heating unit 8, and this will ultimately mean that the fuel generally will have more heat as and when supplied to the carburetor.

Turning now to the heating unit 8, it will be noted that the same has a general collar conformation, that is to say that such unit is more or less built in a generally cylindrical shape, having relatively flat ends 20. As aforementioned the element 8 is interposed between the exhaust port 3 and the pipe 6 and is firmly held in place by ears 21 and bolts 22, or by any other suitable securing means. The element 8 as aforementioned has running therethrough the central passageway 9 which is bounded by a cylindrical wall 23. Surrounding the cylindrical wall 23, but radially spaced apart therefrom by an appropriate distance is a second cylindrical wall 24, which, it will be noted, is radially spaced apart from the internal cylindrical surface 25, of heating unit 8.

It will be noted that each of pipes 13 and 14 are so arranged that the ends thereof lie adjacent each other and are separated by the element 26 which is integrally joined to wall 23. Thus, pipe 13 opens into one end of the chamber lying between walls 23 and 24 while pipe 14 opens into the other end of said chamber. It will be further noted that wall 24 is integrally joined to the inner surface 25 of unit 8 by the elements 27 at each end of wall 24. It, of course, will be understood that elements 26 and 27 need only be provided at the region where the pipes 13 and 14 join the unit 8, since the unit 8 throughout may be fabricated as a single element provided with appropriate passages therethrough and the walls constituting an integral part thereof. As a result of the construction just described it will be observed that I have provided within my heating unit 8 three concentric chambers. The innermost chamber is the passage-way 9 through which exhaust gases are adapted to pass from one flat surfaced side towards the other flat surfaced side of the unit 8, giving up heat in such passage to the surrounding chambers. The next chamber is that lying between walls 23 and 24 and here it will be noted that fuel entering from the open end of pipe 13 is adapted to circulate through said chamber in intimate contact with wall 23 and substantially circumferentially over the surface of said wall and to leave said chamber at its far end through the open end of pipe 14, it being understood that in and by such circulation the fuel is heated from the heat carried in the exhaust gases and given up therefrom in passage through passageway 9. The outermost chamber is, of course, that lying between wall 24 and the inner surface 25 of unit 8. The purpose and function of the outermost chamber will now be described in detail.

Turning to the outer surface of unit 8, it will be found that the same is preferably formed with a plurality of vanes 28 each of which extend from one flat surfaced side 20 over the whole of the width of the unit to the other flat surfaced side 20. These vanes are preferably an integral part of the metal of the unit 8 and the top or outermost surface of each of said vanes is preferably rectangular in outline, with each vane increasing in width from its top towards its bottom where it joins integrally with the outer surface of unit 8. Substantially in the very center both longitudinally and transversely of the rectangular top or outermost surface of each of the vanes 28 a radial cylindrical passageway 29 opens from said surface into the chamber lying between the wall 24 and the inner surface 25 of unit 8. Over the free end of each of the vanes 28 I preferably affix an inverted trough-like vane-canopy or cap 30, which is provided with sides 31 and 32 which are relatively flat and are adapted, on their inner surfaces, to snugly sit against the sides 20 of the unit 8. It will be understood that appropriate means are to be provided for holding each vane-canopy or cap 30 in proper inverted position with its bottom surface 33 radially spaced apart an appropriate distance from the rectangular top or outermost surface of each of the vanes 28. This means may consist in an internal rib or ridge 34 being impressed transversely of the width of each of sides 31 and 32 of element 30, which rib or ridge is arranged to snap into a cooperating channel 35 formed transversely of the metal of unit 8 on each of the surfaces 20 thereof, so that the sides 31 and 32, and, in fact the whole element 30, will be apropriately held in position with respect to the vane 28. At this point it should be understood that other means such as bayonet pins, with cooperating bayonet pin holes, or other suitable securing means might be employed for this purpose, but that I have found the rib and channel means satisfactorily effective.

It will next be noted that each vane-canopy or cap 30 is provided with sloping sides 36 and 37 which diverge away from the surface 33. Element 36 terminates in a flange 38 which lies in a plane substantially parallel to surface 33. Element 37 likewise terminates in a flange rib 39 lying in the same or substantially the same plane as that of element 38. Each of elements 38 and 39 are preferably integral with the vane-canopy or cap 30 and are of such width that an ample space is left between the free edge of each of said elements and the metal of the vane 28 when the vane-canopy or cap is held in position on the vane for the purposes herein disclosed. Interposed between the external sloping surfaces of each vane 28 and the internal surfaces of elements 36 and 37 of each vane-canopy or cap 30 and held in position by the flanges 38 and 39 there is a quantity of material 40, preferably such as stainless steel wool or the like, adapted to provide a filter for any air passing therethrough. It will be understood, of course, that the flanges 38 and 39 and the material 40 are adapted to extend over the whole of the width of each vane 28. It will be further understood that relatively cold air at atmospheric conditions is drawn at each vane 28 into the space between the sloping sides of the vane and the edges of elements 38 and 39, passes through the filter material 40, is guided by the walls 36, 37 up into the space lying between the surface 33 and the outermost surface of the vane and from there passes through passageway 29 into the chamber lying between the wall 24 and the internal surface 25 of the unit 8. Thus, it will be understood, filtered air enters into said chamber at a plurality of points over the circumference thereof, is heated in passing through said chamber and permitted to leave said chamber via the pipe 41 which is of relatively large diameter. It will therefore be understood that in heating unit 8 the heat from the exhaust gases is adapted by passing through the passageway 9 to heat fuel caused to circulate in a concentric chamber and likewise to heat air in another outer concentric chamber.

The air, thus heated in the unit 8 and passing down the pipe 41 is admitted into a cylindrical chamber 42 adjacent the top thereof. Chamber 42, it will be noted, is more or less barrel-like in form and provided with a series of successive circular ribs. Starting adjacent the entry of pipe 41 into chamber 42 and going towards the right it will be observed that I preferably provide and have shown five circular ribs which successively are, an internal rib 43, an external rib 44, an internal rib 45, an external rib 46 and an internal rib 47. The effect of these ribs is to render the internal surface of the chamber 42 more or less corrugated with the result and effect that any fluids or solid material carried by the air passing therethrough will tend to be thrown down. Moreover, the presence of the ribs will tend to present a cooling vane effect and be effective to slightly cool the air passing from left to right in chamber 42 and guard against overheat of chamber 42 and its contents. The ends of chamber 42 are provided with threaded or snap-fit closure caps 48 and 49 either or both of which are preferably detachable and removable for purposes of cleaning the interior of the chamber and the like. Near the right end of the chamber 42 adjacent closure cap 49 an outlet pipe 50 opens adjacent the bottom of chamber 42. This outlet pipe just before it emerges from chamber 42 is provided with a diagonally downward pointed opening 51. It should be understood that the diameter of pipe 50 is smaller than that of pipe 41 and that the heated air entering from pipe 41 will in chamber 42 be somewhat cooled, allowed to expand, be cleaned and presented at pipe 50 for the further purposes and uses hereinafter described. It will next be noted that the provision of the opening 51 in pipe 50 will tend to prevent the flow in pipe 50 from being blocked and tend to mix with the cooler air coming from adjacent the bottom of chamber 42, a portion of heated air coming from adjacent the top of chamber 42.

The air flowing through pipe 50 is controlled by a valve 52 and after passing through said valve enters the collarlike mixing chamber 53 where it is mixed with the charge coming from the carburetor just before the same enters the intake manifold 5. The valve 52 may be of any standard type such as a conventional butterfly valve disposed in pipe 50 and so arranged that the same is always held slightly open by a pin stop 54a, said pin limiting the returning action of a resilient spring 55a tending to normally keep said valve closed. A preferable construction for control of valve 52 would consist in a stationary casing 56a in which a piston 57a and piston rod 58a as well as a second piston 59a and a piston rod 60a are adapted to work; said pistons being joined by a resilient element such as a spring or the like 61a. The piston rod 58a is preferably joined by a suitable connecting unit such as a rigid strap or the like 62a together with rod 63 coming from the foot accelerator, so that piston rod 58a and rod 63 will move together; while the piston rod 60a is adapted to actuate the valve 52 via a bell-crank lever 64. From this construction it will be observed that the butterfly valve 52 is always slightly open, that pressure of the foot on the accelerator will move rod 63 and connecting element 62a, so that the connected piston rod 58a as well as piston 57a, spring 61a, piston 59a, and piston rod 60a are moved along in casing 56a until piston 59a reaches the end of said casing at which time butterfly valve 52 will have been completely opened via piston rod 60a and bell-crank lever 64 against the returning action of spring 55a. Further pressure of the foot upon the accelerator will, of course, act merely to compress spring 61a and the butterfly valve will remain fully open. Release of pressure of the foot upon the accelerator, as is obvious, will result in the butterfly valve being closed except to the slight degree and as limited and arranged for by stop 54a. Thus it may be observed that the butterfly valve 52 is so arranged that the same will always be slightly open during idling of the motor and that upon feeding fuel to the motor to accelerate the same, the butterfly valve will immediately be thrown open to its full extent and remain so as long as foot pressure is maintained upon the accelerator.

Turning now to the collar-like mixing chamber 53, it will be found that the same is interposed between the flange-like end 54 of carburetor 15 and the flange-like end 55 of the inlet side of the intake manifold and that the same is firmly held in place by ears 56 and bolts 57. Chamber 53 is provided with an internal passageway 58 preferably of circular cross section which passageway runs completely around inside of the element 53, and provision is made so that pipe 50 will open into the passageway 58. It will be understood that the element 53 has a central cylindrical passageway 59 running therethrough so that the charge coming from the carburetor 15 may pass through the chamber 53 before entering the intake manifold 5. Passageway 58 opens into passageway 59 by means of a plurality of circumferentially spaced apart holes 60 so that the air transmitted along pipe 50 to passageway 58 may enter into passageway 59 at a plurality of points over the interior circumference thereof. The holes 60 joining passageway 58 with passageway 59 I preferably arrange to slant through the metal of element 53 in the direction of the flow of the charge through passageway 59. (See the holes 60 in Fig. 1 particularly those shown in the cross hatched portion of element 53.)

It will be understood from the foregoing that the heated air coming through pipe 50 and circulating in passageway 58 will, over the internal circumference of passageway 59 of element 53, enter into the passageway 59, become intimately associated with the charge passing through said passageway, and be intermingled therewith upon entry of the charge into the intake manifold.

In the pipe 4 joining the intake manifold with the inlet port of the engine and just before such pipe opens into the inlet port, I preferably provide a sleeve 61 of brass or like material provided with a chamfer 62 at the end furthest away from the inlet port. This sleeve, as is obvious, will have the effect of reducing the diameter of the orifice of pipe 4 as same opens into the inlet port and I believe the inclusion of such sleeve to be desirable; the chamfer of the sleeve being provided so as to leave substantially unimpeded the general smoothness of flow through pipe 4 towards the inlet port.

Having thus described a preferable construction, I will now briefly describe the method and manner of operation thereof. I have found that there are two requirements for high efficiency of combustion. In the first place the final compression pressure and temperature must be high. This results in high efficiency theoretically and in practice the charge usually is more readily ignited and burned from high pressure. The limit, of course, is reached when the pressure is so high as to cause spontaneous ignition of the charge during compression. It, of course, usually follows that the greater the pressure and temperature at the end of compression, the higher will be the final temperature immediately after ignition and just before the piston starts upon the explosion stroke.

In the second place the maximum temperature at this last mentioned particular point should really be as low as possible since loss of heat to the metallic cylinder walls, etc. increases rapidly at high temperatures and energy thus might be dissipated by unduly large heat losses just before the piston starts on expansion stroke. As is obvious, the two requirements for high efficiency are thus more or less opposed. However, such requirements are best brought into agreement with each other by the use of a large excess of air which gives a mixture which may be highly compressed without danger of spontaneous ignition. Due to the presence of a large excess of air, combustion and accompanying oxidation is rendered full and complete and because of the excess of air present, the final temperature attained immediately after explosion is comparatively low. Despite the presence of the excess air it might be said that the mixture burns rapidly enough at high pressures for satisfactory combustion. With these basic thoughts in mind it will be noted that in my construction fuel from the fuel tank 10 is delivered by the fuel pump to the heating unit 8 and thence to the carburetor where, being preheated, it receives the conventional amount of air provided in a carburetor. When the charge leaves the carburetor it is mixed in the mixing chamber 53 with a further amount of air which has been preheated, cleaned and placed under proper pressure and delivered to the mixing chamber 53 for entry into the passageway 59 via the holes 60. The final mixture of preheated fuel and air together with the added heated air at predetermined proper pressure and temperature is then delivered down to the intake manifold and passes through the sleeve 61, if present, before such mixture is delivered to the inlet port. Since I utilize for heat the residue heat in the exhaust gases of the engine the efficiency of my system is further increased.

It will be understood, of course, that due to the smaller size of the pipe 50 as compared with that of pipe 41 as well as the delivery of the air coming from pipe 50 into the charge coming from the carburetor 15, that for a given volume of charge the overall pressure will be increased and that the air will tend to "dilute' and render more "lean" the resulting charge. The characteristic conditions of the resulting mixture, I believe will be found thereafter to be still further beneficially affected by the sleeve 61 of reduced diameter. At this point it may be stated that, if desired, a conventional pressure raising means may be included. Thus, if desired, the resulting charge may be passed at proper rate of flow through a greatly narrowed orifice before entering the inlet port or even upon opening of the inlet valve be sprayed or otherwise forced into the cylinder through an appropriate orifice under the affirmative pressure of some pressure boosting means such as a pump or the like. However, in this regard, it must also be borne in mind that the pressure of the final mixture delivered into the cylinder should always be below a point where subsequent compression in the cylinder might result in possible spontaneous ignition of the charge, as heretofore mentioned.

From the foregoing it will be understood that my system is such that the fuel is preheated from heat in the exhaust gases, mixed with air in the carburetor and the resulting mixture thereafter mixed with more air which has been preheated and thereafter the final mixture is delivered under suitable pressure to the inlet port. It will be further understood that I have disclosed various means and devices for assuring proper operating characteristic conditions of charge such as temperature, pressure, density and the like and further that I have provided devices for assuring proper cleanliness and conditioning of the air to be employed. Further, that I have provided means adapted to compensate for differences in atmospheric temperature.

It will, of course, be understood that it may be found more convenient or desirable to arrange to place the heating unit 8 directly in or around the exhaust manifold rather than immediately adjacent the exhaust port of a cylinder. This might be preferable in the case of an engine having many cylinders, however, in any event, such appropriate arrangements should be made that the heating unit 8 is so located that it is effective to produce the desired temperature of heat in the fuel and air to be heated. Further, it may be found in practice that location of such unit adjacent one of a number of cylinders will be sufficient. Further, in the case of an engine having many cylinders it may also be found desirable to interpose the sleeve 61 in the pipe leading to the intake manifold rather than in the various pipes leading from the intake manifold to the various inlet ports and just before such pipes open into said inlet ports. If this was done, I believe that the pipes leading from the intake manifold ought be of such diameter that the beneficial effects occasioned by the sleeve would be maintained right up to the respective inlet ports, i. e., the effective diameter of pipe having been decreased, the same ought not, in the pipes leading from the intake manifold, be in any way increased or so arranged that the mixture characteristic conditions are in any way varied in passage up to the inlet ports.

I am, of course, fully aware that these and various other changes in the details of construction and relative arrangement of parts will readily suggest themselves to those skilled in the art and I do not, therefore, desire to be limited to the exact details herein set forth by way of illustration, but rather to the spirit and scope of my invention as I define it in the appended claims.

What I seek to secure by and claim for United States Letters Patent is:

1. In a construction of the type described an internal combustion engine having inlet and exhaust ports, means for heating fuel from the heat contained in the gases leaving the exhaust port, a carburetor adapted to utilize air at atmospheric conditions to produce a combustible mixture, means for conveying such heated fuel to said carburetor, means for heating air from the heat contained in the gases leaving the aforesaid exhaust port, means for adding to the combustible mixture of air and preheated fuel leaving the carburetor an appropriate amount of air thus heated and means for supplying the resulting mixture to the inlet port of said engine.

2. In a construction of the type described an internal combustion engine having inlet and exhaust ports, means for heating fuel from the heat contained in the gases leaving the exhaust port, a carburetor adapted to utilize air at atmospheric conditions to produce a combustible mixture, means for conveying such heated fuel to said carburetor, means for conveying the charge coming from said carburetor to said engine, means for heating air from the heat contained in the gases leaving the aforesaid exhaust port, means for intermingling said heated air with the charge coming from the carburetor and means for supplying the resulting mixture to the inlet port of said engine.

3. The method of preparing a combustible charge for use in an internal combustion engine which consists in heating volatile fuel, delivering same to a carburetor where air at atmospheric conditions is added thereto and thereafter further adding an amount of heated air to the mixture.

4. The method of preparing a combustible charge adapted to high efficiency on use in an internal combustion engine which consists in heating fuel, preparing a combustible mixture thereof with an appropriate amount of air at atmospheric conditions, adding to said mixture an appropriate amount of heated air and delivering the resulting mixture to the internal combustion engine.

5. In a construction of the type described an internal combustion engine having inlet and exhaust ports, means for heating fuel from the heat contained in the gases leaving the exhaust port, a carburetor, means for conveying such heated fuel to said carburetor, means for heating air from the heat contained in the gases leaving the exhaust port, means for conveying said air to a chamber where the same is expanded, cleaned, slightly cooled and rendered available for further use at proper pressure, a mixing chamber wherein the charge coming from the carburetor may be mixed with additional air, means for conveying air from said first mentioned chamber to said mixing chamber for admixture therein with the charge coming from the carburetor, and means for conveying the resulting mixture to the inlet port of said engine.

6. The structure recited in claim 5 characterized in that the heating means for fuel and air consists in a collar-like cylindrical unit through which the exhaust gases are adapted to flow and which unit is provided with a plurality of radially spaced apart concentric chambers separated from each other and from the passageway through which said exhaust gases flow, said chambers being so arranged that the fuel or air to be heated may circulate in a given chamber.

7. The structure recited in claim 6 characterized in that the mixing chamber consists in a collar-like cylindrical unit having a central passageway through which the mixture coming from the carburetor is adapted to pass and a concentric passageway of substantially circular cross section surrounding said central passageway and opening into said central passageway at a plurality of circumferentially spaced apart holes slanting in the direction of flow of the mixture through said central passageway, said concentric passageway being provided with an orifice through which air may be admitted and delivered into said central passageway at the plurality of circumferentially spaced apart holes.

8. In a construction of the type described for admitting heated air into a chamber where the same is intermingled with a combustible charge coming from a carburetor and adapted to delivery to an internal combustion engine for use therein, means for controlling the flow of charge to said engine, a source of heated air, means for conveying said heated air to the chamber where intermingling takes place, a valve interposed in said conveying means, means for preventing said valve from ever completely closing, means normally tending to close said valve, means for opening said valve to its maximum extent upon actuation of the means aforesaid for controlling the flow of charge to said engine and means for absorbing further actuation thereof when said valve is once opened to its maximum extent.

9. In a construction of the type described an internal combustion engine having inlet and exhaust ports, a carburetor, a source of fuel supply, means for regulating the flow of charge from said carburetor to the inlet port of the engine, means for delivering fuel from said source of fuel supply for circulation about the exhaust gases so that the heat thereof may in part be transmitted to said fuel, means for conveying the fuel thus heated to the carburetor, means for circulating air in clean condition about the exhaust gases so that the heat thereof may in part be transmitted to said air, means for conveying the air thus heated to a chamber in which the same is expanded, cleaned to a further extent and slightly cooled, a mixing chamber through which the charge coming from the carburetor is adapted to pass and in which such charge may be intermingled with air, means for conveying heated air from the chamber in which same was expanded, cleaned and cooled as aforesaid to said mixing chamber for admixture therein with the charge coming from the carburetor, means interposed in said last mentioned conveying means for always permitting a small amount of the heated air to pass into the mixing chamber and for permitting such air to pass into said mixing chamber to the maximum possible extent, upon actuation of the means for regulating the flow of charge from the carburetor to the inlet port to increase such flow over that normally present during idling of the engine, and means for delivering the resulting mixture to the engine inlet port.

10. The structure recited in claim 9 characterized in that the means for heating fuel and air from the heat contained in the exhaust gases consists in a cylindrical collarlike element having flat ends and having a central passageway extending through said element from one flat end to the other through which pasageway exhaust gases are adapted to pass on their way to atmosphere from the exhaust port of said engine, said element being provided with two separated chambers concentrically disposed about said passageway in radially spaced apart relation all so that the heat contained in the exhaust gases passing through the central passageway may be transmitted to said concentric chambers and the contents thereof heated thereby; said element being further provided with means whereby fuel may be admitted to one end of one of said concentric chambers and after circulation through said chamber withdrawn at the other end of said chamber, and with further means whereby air may be admitted at a plurality of points over the external circumference of said element, filtered and passed in to the other of said concentric chambers at a number of points, heated in said chamber and withdrawn therefrom at a given point on the internal circumference of said chamber for further use.

11. The structure recited in claim 9 characterized in that the means for conveying the heated air to the chamber in which the same is expanded, cleaned and cooled opens into said chamber adjacent the top thereof and that the means for conveying the heated air out of and from said chamber opens adjacent the bottom of said chamber and is provided with a small opening adjacent the top of said chamber but therewithin.

12. The structure recited in claim 9 characterized in that the means for conveying the heated air out of and from the chamber where the same was expanded, cleaned and cooled consists in a pipe of relatively small diameter compared with the pipe through which the heated air was supplied to said chamber and which last mentioned pipe constitutes the means for conveying the heated air into said chamber.

13. The structure recited in claim 9 characterized in that the chamber in which the air which has been heated is expanded, additionally cleaned and slightly cooled is substantially barrel-like in form and is provided with successive ribs which are alternately internal and external over the circumference thereof and is provided with a detachable end closure cap adapted to be removed when the interior of said chamber is to be cleaned.

14. The method recited in claim 3, characterized in that only a portion of the heated fuel is delivered to the carburetor and the remainder is returned to and intermingled with the fuel not yet heated.

15. The structure recited in claim 9 characterized in that the mixing chamber is of general cylindrical form and is adapted to be located beteen the carburetor and the intake manifold of the engine and is provided with a central passageway extending therethrough and through which the charge coming from the carburetor is adapted to pass on its way towards the inlet port of the engine, and is further provided with a second passageway of substantially circular cross-section spaced apart from but surrounding the first passageway, which second passageway is connected to the first passageway by a plurality of circumferentially spaced apart holes joining the second passageway with the internal surface of the first passageway, through which holes air may be admitted from the second passageway to the first passageway for admixture therein with the charge passing therethrough.

HENRY SILVERSTEIN.

CERTIFICATE OF CORRECTION.

Patent No. 2,179,235. November 7, 1939.

HENRY SILVERSTEIN.

It is hereby certified that error appears in the printed specification of the above numbered patent requiring correction as follows: Page 3, second column, line 37, strike out the word "rib"; page 6, first column, line 58, claim 7, for the claim reference numeral "6" read 5; and that the said Letters Patent should be read with this correction therein that the same may conform to the record of the case in the Patent Office.

Signed and sealed this 19th day of December, A. D. 1939.

(Seal)

Henry Van Arsdale,
Acting Commissioner of Patents.